(12) United States Patent
Nasre

(10) Patent No.: US 7,694,095 B2
(45) Date of Patent: Apr. 6, 2010

(54) MANAGING SNAPSHOTS USING MESSAGES

(75) Inventor: Rupesh Nasre, Nagpur (IN)

(73) Assignee: NetApp, Inc., Sunnyvale, CA (US)

( * ) Notice: Subject to any disclaimer, the term of this patent is extended or adjusted under 35 U.S.C. 154(b) by 366 days.

(21) Appl. No.: 11/900,271

(22) Filed: Sep. 10, 2007

(65) Prior Publication Data

US 2009/0070536 A1    Mar. 12, 2009

(51) Int. Cl.
*G06F 12/00* (2006.01)

(52) U.S. Cl. .................. 711/162; 711/112; 711/114; 711/151; 711/156; 707/201; 707/204

(58) Field of Classification Search ............ 711/162, 711/112, 114, 151, 156; 707/201, 204
See application file for complete search history.

(56) References Cited

U.S. PATENT DOCUMENTS

| | | | |
|---|---|---|---|
| 6,647,473 B1 * | 11/2003 | Golds et al. ............ 711/161 |
| 7,162,662 B1 * | 1/2007 | Svarcas et al. ............ 714/15 |
| 7,287,249 B2 * | 10/2007 | Coyle et al. ............ 717/168 |
| 7,363,537 B1 * | 4/2008 | Svarcas et al. ............ 714/15 |
| 7,437,360 B1 * | 10/2008 | Chitre et al. ............ 707/8 |
| 7,478,101 B1 * | 1/2009 | Manley ............ 707/100 |

\* cited by examiner

*Primary Examiner*—Stephen C Elmore
(74) *Attorney, Agent, or Firm*—Perkins Coie LLP

(57) ABSTRACT

A method and apparatus for managing snapshots of a file system using messages. A snapshot is a restorable version of a file system created at a predetermined point in time. A message is a persistent data structure supported by a file server. A message may include one or more snapshots, attributes for the message, and/or access control information for the message. The attributes and access control information are applied to all snapshots in the message. The attributes in the message enable users to perform automatic event-based management of the snapshots in the message. The access control information in the message provides granular access control to the snapshots in the message.

39 Claims, 8 Drawing Sheets

MANAGING SNAPSHOTS USING MESSAGES

FIELD OF INVENTION

The present invention generally relates to managing snapshots of file systems, and more particularly, to a method and system for providing granular access control to and management of snapshots using messages.

BACKGROUND

Because traditional file systems are too large to be transferred, this problem is typically addressed through the use of snapshots. A snapshot is a restorable version of a file system created at a predetermined point in time. A snapshot may contain any changes to a file system's data blocks since a previous snapshot has been taken. To transfer a file system using a snapshot, a first client requests a file server to create a snapshot and then a second client accesses the snapshot and recreates the file system. The recreated snapshot can either be shared with the second client or the second client can replicate the data contained within the snapshot using a software application.

However, file servers in use today frequently use role based access control (RBAC). Pursuant to RBAC, a file server creating a snapshot cannot define a role that restricts access to the snapshot. The file server creating the snapshot defines a capability of restoring the snapshot and a role to a group of clients as opposed to a target recipient of the snapshot.

Capabilities, including the capability of restoring a snapshot, are usually defined by a storage administrator. However, the storage administrator may not be aware of the application semantics used at the file servers for storage objects created by the file servers. Therefore, a file server defines capabilities for snapshots and other storage objects created by the file server.

A combination of these capabilities defines a role. A group of clients are created having specified roles. Thus, all clients within a group have the same capabilities defined by a specified role and no clients outside the group have those capabilities.

The capability of restoring a snapshot is common across all snapshots. For example, suppose a creator of a snapshot is from a human resource department and a user restoring the snapshot is from a finance department. If a user in the engineering department has a capability of restoring a snapshot, that user is able to access the data contained in the created snapshot even though that user is not the intended recipient of the snapshot. Currently, there may be no way for the user in the human resource department to prevent users in the engineering department from accessing the data contained in the snapshot.

This lack of access control poses a security threat to data contained within the snapshot, because any user within the group is able to view the contents of the snapshot. Currently, there may be no mechanism that permits the user creating the snapshot to restrict access to the snapshot to a selected user or a selected group of users. Therefore, there is a need for managing access control to snapshots to enable the creator of a snapshot to define different capabilities for different snapshots without the limitations of the prior art.

SUMMARY

The present invention is a method and apparatus for managing snapshots of a file system using messages. A snapshot is a restorable version of a file system created at a predetermined point in time. A message is a persistent data structure supported by a file server. A message may include one or more snapshots, attributes for the message, and/or access control information for the message. The attributes and access control information are applied to all snapshots in the message. The present invention has the advantages of providing granular access control over snapshots and enabling users to perform automatic event-based management of snapshots (via attributes). Access to the snapshots in the message can be restricted to a selected user or a selected group of users via the access control information in the message. By using the access control, security threats to data contained within the snapshot can be reduced, because the message specifies the exact users that may view the contents of the snapshots in the message.

BRIEF DESCRIPTION OF THE DRAWINGS

A more detailed understanding of the invention may be had from the following description of preferred embodiments, given by way of example, and to be understood in conjunction with the accompanying drawings, wherein.

DETAILED DESCRIPTION OF THE PREFERRED EMBODIMENTS

Figure 1:
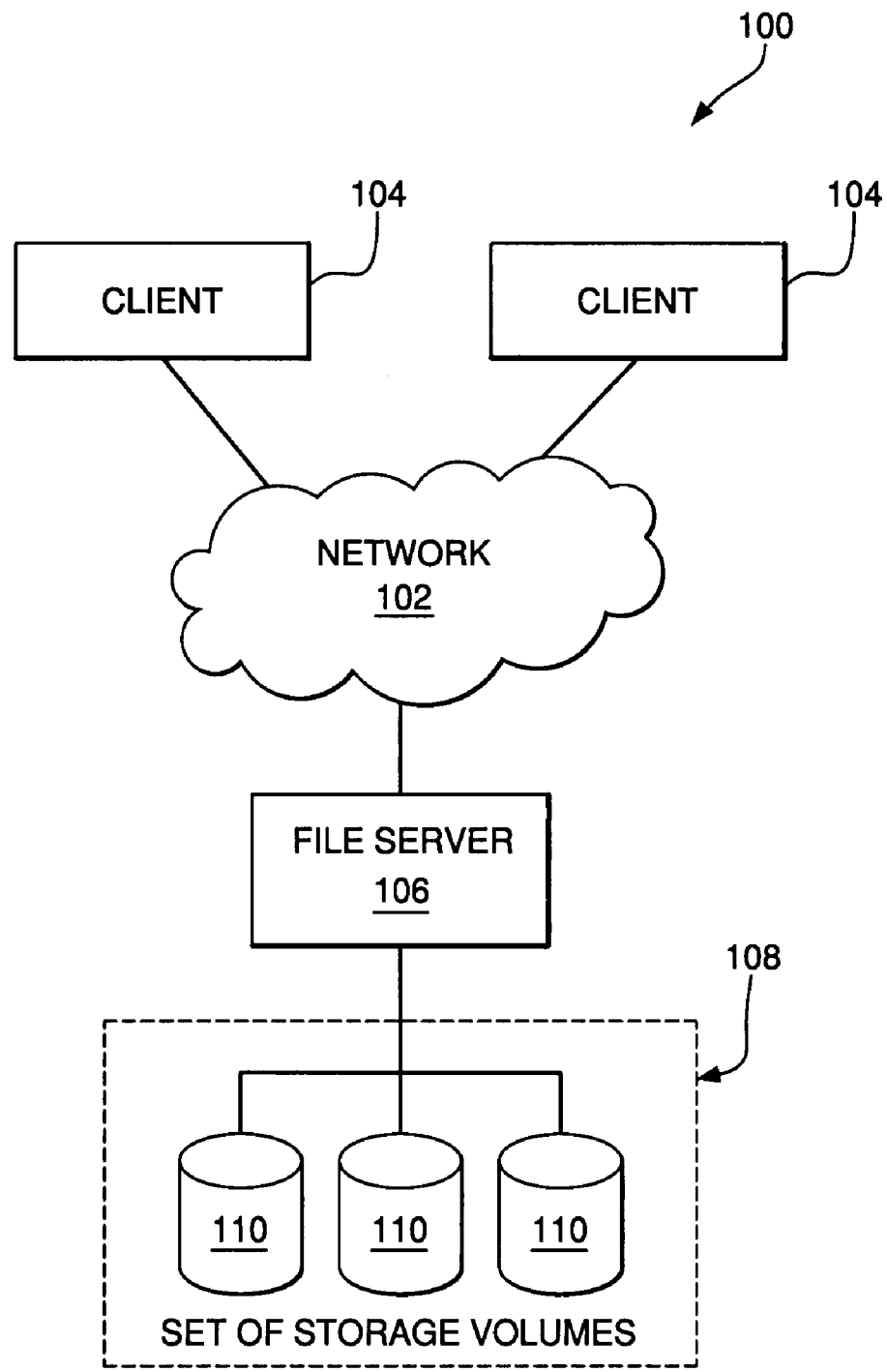
FIG. 1 is a block diagram of a network environment in which the present invention can be implemented.

The present invention permits a user creating a message to restrict access to the one or more snapshots (also known as "point in time images") included in the message to a selected user or a selected group of users by using an access control for the message. The access control reduces a security threat to data contained within the snapshot, because the message specifies the exact users that may view the contents of the snapshots in the message. Further, the present invention permits a user creating a message to define an event-based trigger for managing the snapshots in the message using attributes defined for the message.

The present invention is a method and apparatus for managing snapshots of a file system using messages. A snapshot is a restorable version of a file system created at a predetermined point in time. A message is a persistent data structure supported by a file server. A message may include one or more snapshots, attributes for the message, and/or access control information for the message. The attributes and access control information are applied to all snapshots in the message. The present invention has the advantages of providing granular access control over snapshots and enabling users to perform automatic event-based management of snapshots (via attributes).

In an exemplary embodiment, the present invention is implemented as an application executing on a computer operating system. It is noted that the principles of the present invention are applicable to any type of network attached storage (NAS) device running any type of operating system. For example, a NAS device can include the NearStore® storage system running the NetApp® Data ONTAP® operating system available from Network Appliance, Inc., Sunnyvale, Calif. Further, the principles of the present invention are applicable to any type of storage area network (SAN).

A file server is a computer that provides file services relating to the organization of information on storage devices, such as disks. The file server (also called a "filer") includes a storage operating system that implements a file system to logically organize the information as a hierarchical structure of directories and files on the disks. Each "on-disk" file may be implemented as a set of disk blocks configured to store information, such as text, whereas the directory may be implemented as a specially-formatted file in which information about other files and directories are stored. A filer may be configured to operate according to a client/server model of information delivery to thereby allow many clients to access files stored on a server, e.g., the filer. In this model, the client may comprise an application, such as a file system protocol, executing on a computer that "connects" to the filer over a computer network, such as a point-to-point link, shared local area network (LAN), wide area network (WAN), or virtual private network (VPN) implemented over a public network such as the Internet. Each client may request the services of the filer by issuing file system protocol messages (in the form of packets) to the filer over the network.

A common type of file system is a "write in-place" file system, an example of which is the conventional Berkeley fast file system. In a write in-place file system, the locations of the data structures, such as inodes and data blocks, on disk are typically fixed. An inode is a data structure used to store information about a file, such as meta data whereas the data blocks are structures used to store the actual data for the file. The information contained in an inode may include, e.g., ownership of the file, access permission for the file, size of the file, file type, and references to locations on disk of the data blocks for the file. The references to the locations of the file data are provided by pointers, which may further reference indirect blocks that, in turn, reference the data blocks, depending upon the quantity of data in the file. Changes to the inodes and data blocks are made "in-place" in accordance with the write in-place file system. If an update to a file extends the quantity of data for the file, an additional data block is allocated and the appropriate inode is updated to reference that data block.

Another type of file system is a "write-anywhere" or "copy on write" file system (or the like) that does not overwrite data on disks. If a data block on disk is retrieved (read) from disk into memory and "dirtied" with new data, the data block is stored (written) to a new location on disk to thereby optimize write performance. A write-anywhere file system may initially assume an optimal layout such that the data is substantially contiguously arranged on disks. The optimal disk layout results in efficient access operations, particularly for sequential read operations, directed to the disks. A particular example of a write-anywhere file system that is configured to operate on a filer is the Write Anywhere File Layout (WAFL®) file system available from Network Appliance, Inc. The WAFL® file system is implemented within a microkernel as part of the overall protocol stack of the filer and associated disk storage. This microkernel is supplied as part of Network Appliance's Data ONTAP® storage operating system, residing on the filer, that processes file-service requests from network-attached clients.

As used herein, the term "storage operating system" generally refers to the computer-executable code operable on a storage system that manages data access and may, in case of a filer, implement file system semantics, such as the Data ONTAP® storage operating system, which is implemented as a microkernel. The Data ONTAP® storage operating system is available from Network Appliance, Inc. and implements a file system, such as the Write Anywhere File Layout (WAFL®) file system. The storage operating system can also be implemented as an application program operating over a general-purpose operating system, such as UNIX® or Windows®, or as a general-purpose operating system with configurable functionality, which is configured for storage applications as described herein.

Disk storage is typically implemented as one or more storage "volumes" that comprise physical storage disks, defining an overall logical arrangement of storage space. Currently available filer implementations can serve a large number of discrete volumes.

The disks within a volume are typically organized as one or more groups of Redundant Array of Independent (or Inexpensive) Disks (RAID). RAID implementations enhance the reliability/integrity of data storage through the writing of data "stripes" across a given number of physical disks in the RAID group, and the appropriate storing of parity information with respect to the striped data. In the example of a WAFL® file system, a RAID-4 implementation is advantageously employed, which entails striping data across a group of disks, and storing the parity within a separate disk of the RAID group. As described herein, a volume typically comprises at least one data disk and one associated parity disk (or possibly data/parity) partitions in a single disk arranged according to a RAID-4, or equivalent high-reliability, implementation.

The term "snapshot" is a trademark of Network Appliance, Inc. and is used for purposes of this description to designate a persistent consistency point (CP) image. A persistent consistency point image (PCPI) is a point-in-time representation of the filer, and more particularly, of the active file system, stored on a storage device (e.g., on disk) or in other persistent memory. A snapshot has a name or other identifier that distinguishes it from other PCPIs taken at other points in time. A PCPI can also include other information (metadata) about the active file system at the particular point in time for which the image is taken. The terms "PCPI" and "snapshot" shall be used interchangeably throughout this description without derogation of Network Appliance's trademark rights. Generally, a snapshot may be viewed as an example of a read-only reference store. In contrast, the active file system may be viewed as an example of an active store that permits read and write operations.

A snapshot is a restorable version of a file system created at a predetermined point in time. Snapshots are generally created on some regular schedule. The snapshot is stored on-disk along with the active file system, and is called into the buffer cache of the filer memory as requested by the storage operating system. After a snapshot has been created and file data blocks modified, the file storage operating system can reconstruct or "restore" the file system structure as it existed at the time of the snapshot by accessing the snapshot.

Network Environment

FIG. 1 is a block diagram of an exemplary network environment 100 in which the principles of the present invention are implemented. The illustrative environment 100 is based around a network 102. The network 102 can be a local area network (LAN), a wide area network (WAN), a virtual private network (VPN) using communication links over the Internet, for example, or any combination of the three network types.

For the purposes of this description, the term "network" includes any acceptable network architecture.

The network 102 interconnects a number of clients 104 and a file server 106. The file server 106, described further below, is configured to control storage of data and access to data that is located on a set 108 of interconnected storage volumes or disks 110. It is noted that the terms "storage volumes" and "disks" can be used interchangeably herein, without limiting the term "storage volumes" to disks.

Each of the devices attached to the network 102 includes an appropriate conventional network interface connection (not shown) for communicating over the network 102 using a communication protocol, such as Transport Control Protocol/Internet Protocol (TCP/IP), User Datagram Protocol (UDP), Hyper Text Transport Protocol (HTTP), Simple Network Management Protocol (SNMP), or Virtual Interface (VI) connections.

File Server

Figure 2:
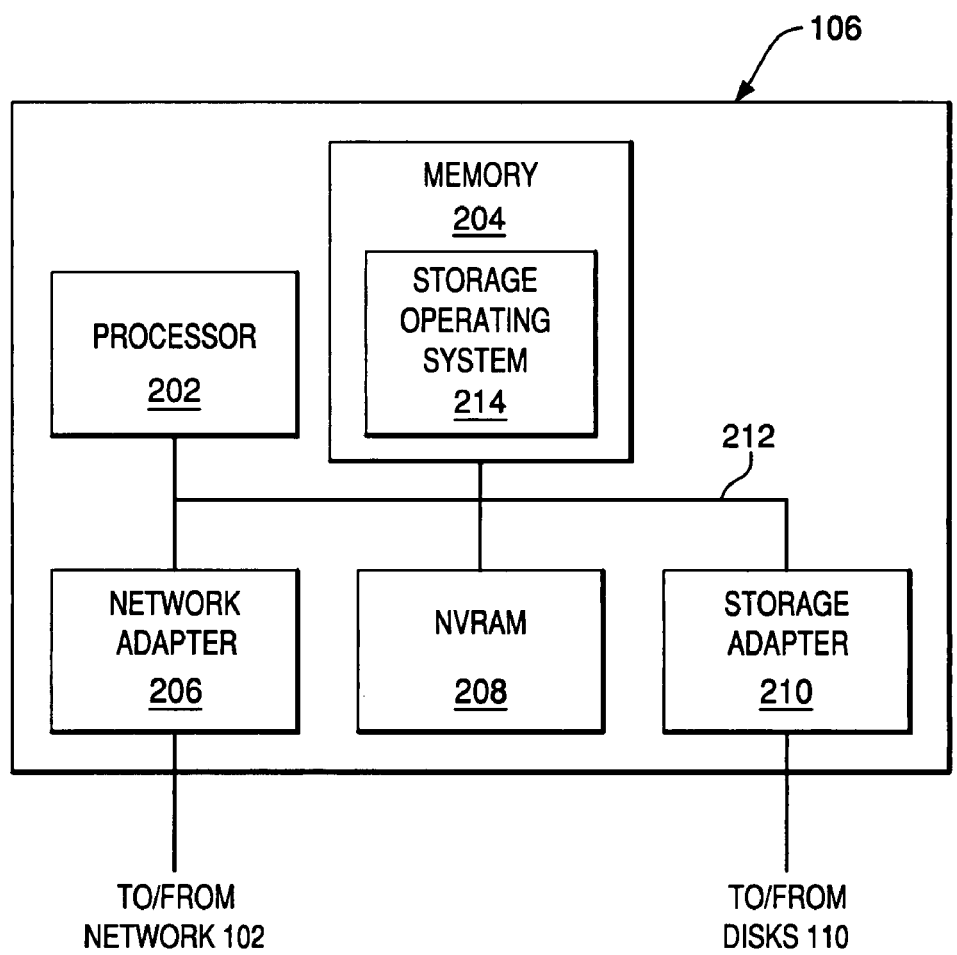
FIG. 2 is a block diagram of the file server shown in FIG. 1.

FIG. 2 is a detailed block diagram of an exemplary file server 106. By way of background, a file server (also known as a "filer") is a computer that provides file services relating to the organization of information on storage devices, such as disks. However, it will be understood by one skilled in the art that the inventive concepts described herein apply to any type of file server and/or network device, wherever implemented, including on a special-purpose computer, a general-purpose computer, or a standalone computer.

The file server 106 includes a processor 202, a memory 204, a network adapter 206, a nonvolatile random access memory (NVRAM) 208, and a storage adapter 210, all of which are interconnected by a system bus 212. Contained within the memory 204 is a storage operating system 214 that implements a file system to logically organize the information as a hierarchical structure of directories and files on the disks 110. In an exemplary embodiment, the memory 204 is addressable by the processor 202 and the adapters 206, 210 for storing software program code. The operating system 214, portions of which are typically resident in the memory 204 and executed by the processing elements, functionally organizes the filer by invoking storage operations in support of a file service implemented by the filer.

The network adapter 206 includes mechanical, electrical, and signaling circuitry needed to connect the filer 106 to clients 104 over the network 102. The clients 104 may be general-purpose computers configured to execute applications, such as database applications. Moreover, the clients 104 may interact with the filer 106 in accordance with a client/server information delivery model. That is, the client 104 requests the services of the filer 106, and the filer 106 returns the results of the services requested by the client 104 by exchanging packets defined by an appropriate networking protocol.

The storage adapter 210 interoperates with the storage operating system 214 and the disks 110 of the set of storage volumes 108 to access information requested by the client 104. The storage adapter 210 includes input/output (I/O) interface circuitry that couples to the disks 110 over an I/O interconnect arrangement, such as Fibre Channel. The information is retrieved by the storage adapter 210 and, if necessary, is processed by the processor 202 (or the adapter 210 itself) prior to being forwarded over the system bus 212 to the network adapter 206, where the information is formatted into appropriate packets and returned to the client 104.

In one exemplary implementation, the filer 106 includes a non-volatile random access memory (NVRAM) 208 that provides fault-tolerant backup of data, enabling the integrity of filer transactions to survive a service interruption based upon a power failure or other fault.

Storage Operating System

To facilitate the generalized access to the disks 110, the storage operating system 214 implements a file system that logically organizes the information as a hierarchical structure of directories and files on the disks. Each "on-disk" file may be implemented as a set of disk blocks configured to store information, such as data, whereas the directory may be implemented as a specially formatted file in which other files and directories are stored. As noted above, in an exemplary embodiment described herein, the storage operating system 214 is the NetApp® Data ONTAP® operating system available from Network Appliance, Inc., that implements the write-anywhere file layout (WAFL®) file system. It is noted that any other appropriate file system can be used, and as such, where the terms "WAFL" or "file system" are used, those terms should be interpreted broadly to refer to any file system that is adaptable to the teachings of this invention.

Figure 3:
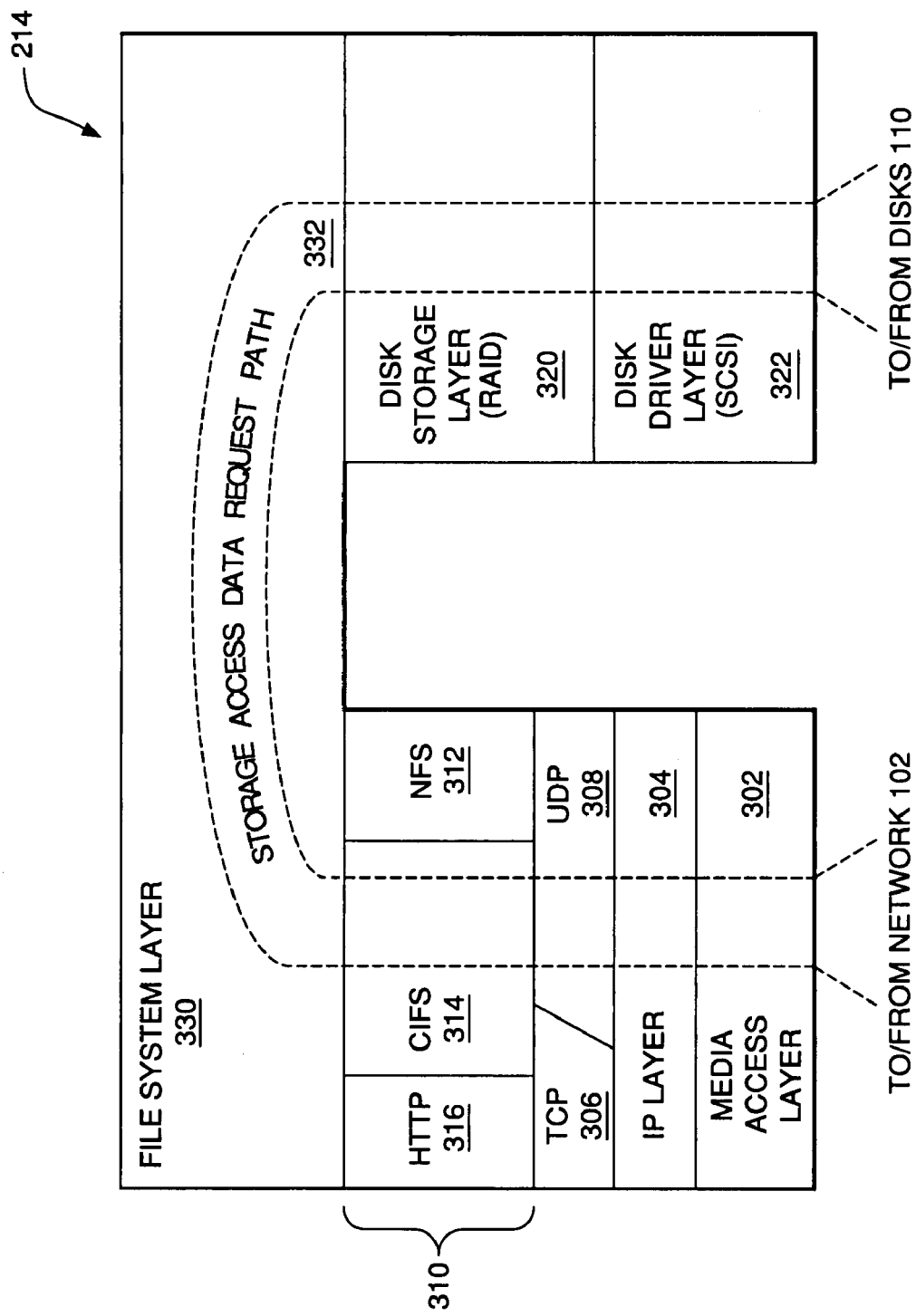
FIG. 3 is a block diagram of the storage operating system shown in FIG. 2.

Referring now to FIG. 3, the storage operating system 214 consists of a series of software layers, including a media access layer 302 of network drivers (e.g., an Ethernet driver). The storage operating system 214 further includes network protocol layers, such as an Internet Protocol (IP) layer 304 and its supporting transport mechanisms, a Transport Control Protocol (TCP) layer 306 and a User Datagram Protocol (UDP) layer 308.

A file system protocol layer 310 provides multi-protocol data access and includes support for the Network File System (NFS) protocol 312, the Common Internet File System (CIFS) protocol 314, and the Hyper Text Transfer Protocol (HTTP) 316. In addition, the storage operating system 214 includes a disk storage layer 320 that implements a disk storage protocol, such as a redundant array of independent disks (RAID) protocol, and a disk driver layer 322 that implements a disk access protocol such as, e.g., a Small Computer System Interface (SCSI) protocol.

Bridging the disk software layers 320-322 with the network and file system protocol layers 302-316 is a file system layer 330. Generally, the file system layer 330 implements a file system having an on-disk format representation that is block-based using data blocks and inodes to describe the files. As described above, an inode is a data structure used to store information, such as meta data, about a file, whereas the data blocks are structures used to store the actual data for the file. The information contained in an inode may include information relating to: ownership of the file, access permissions for the file, the size of the file, the file type, and references to locations on disk of the data blocks for the file. The references to the locations of the file data are provided by pointers, which may further reference indirect blocks that, in turn, reference the data blocks, depending upon the quantity of data in the file.

In the storage operating system 214, a data request path 332 between the network 102 and the disk 110 through the various layers of the operating system is followed. In response to a transaction request, the file system layer 330 generates an operation to retrieve the requested data from the disks 110 if the data is not resident in the filer's memory 204. If the data is not in the memory 204, then the file system layer 330 indexes into an inode file using the inode number to access an appropriate entry and retrieve a logical volume block number. The file system layer 330 then passes the logical volume block number to the disk storage layer 320. The disk storage layer 320 maps the logical number to a disk block number and sends the disk block number to an appropriate driver (for example, an encapsulation of SCSI implemented on a Fibre Channel disk interconnection) in the disk driver layer 322. The disk driver accesses the disk block number on the disks 110 and loads the requested data in the memory 204 for processing by the filer 106. Upon completing the request, the filer 106 (and storage operating system 214) returns a reply, e.g., an acknowledgement packet defined by the CIFS specification, to the client 104 over the network 102.

It is noted that the storage access request data path 332 through the storage operating system layers described above may be implemented in hardware, software, or a combination of hardware and software. In an alternate embodiment of this invention, the storage access request data path 332 may be implemented as logic circuitry embodied within a field programmable gate array (FPGA) or in an application specific integrated circuit (ASIC). This type of hardware implementation increases the performance of the file services provided by the filer 106 in response to a file system request issued by a client 104.

Managing Snapshots Using Messages

Figure 4:
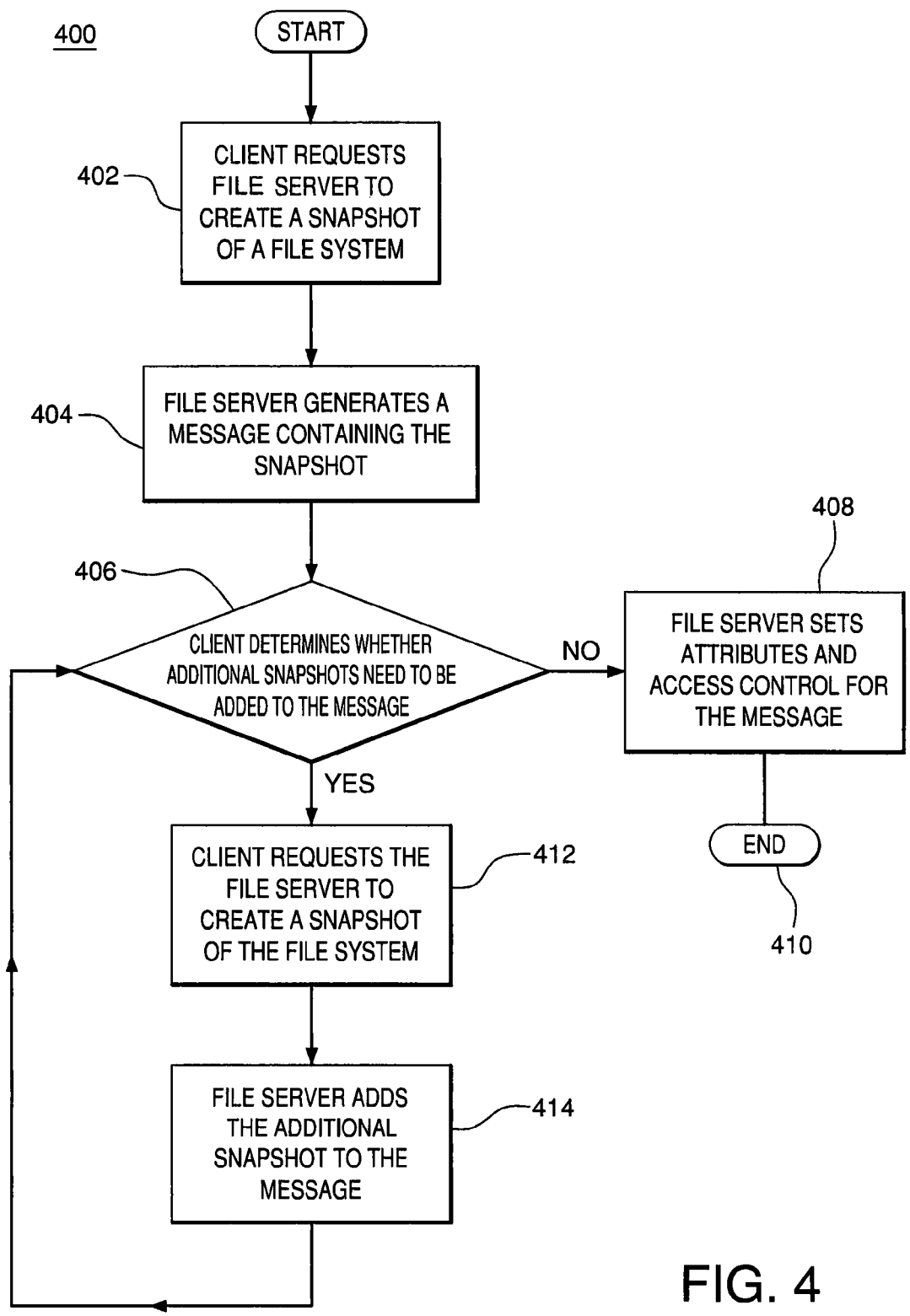
FIG. 4 is a flow diagram of a method for creating a message.

FIG. 4 is a flow diagram of a method 400 for managing snapshots of a file system using messages. A message is a persistent data structure supported by the file server and stored on the file server. A persistent data structure is a data structure that maintains the data contained in the data structure even when the file server is not supplied with power. Therefore, when the file server is switched off and then switched on, the data contained in the persistent data structure is maintained. Examples of other persistent data structures include filer volumes, qtrees, and snapshots. The message has a similar data structure to that of an inode of a file containing the metadata for the file. For example, a message contains the metadata for at least one snapshot including the snapshots, attributes, and/or access control information. The actual format of a message is further defined below with respect to FIG. 5.

A client requests a file server to create a snapshot of a file system (step 402). The client issues the request to the file server via a command line interface or an application program interface (API). The file server creates the snapshot of the file server and generates a message containing the snapshot (step 404).

A user of the client determines whether additional snapshots need to be added to the message (step 406). As an illustrative example, if the user thinks that two or more snapshots are related, then the user may want to ensure that all related snapshots are included in the message. Examples of related snapshots include snapshots from the same department, snapshots of different versions of the same file system, or a snapshot containing a database and a snapshot containing a transactional log for the database. In an alternate embodiment, the determination whether additional snapshots need to be added to the message could be made automatically without user intervention. For example, in some cases, the file system may be layered over disks that span multiple volumes on the file server. A snapshot of such a file system would span multiple snapshots, since a snapshot is taken at the filer volume level. In such circumstances, all related snapshots could be automatically located.

If no additional snapshots are needed for the message, the file server sets attributes and access control information for the message (step 408) and the method terminates (step 410). The advantage of including attributes and access control information for the snapshots contained within a message is explained below.

If additional snapshots need to be added to the message (step 406), the client requests the file server to create a snapshot of the file system (step 412). The file server creates the snapshot of the file system and adds the additional snapshot to the message (step 414). Each snapshot to be added to the message is added one snapshot at a time. The client makes a determination as to whether additional snapshots need to be added to the message (step 406) and the method 400 continues as described above.

In an alternate embodiment (not shown), in step 412, the user could select an existing snapshot to add to the message instead of requesting the file server to create a new snapshot. The operation of the method 400 is otherwise the same as described above.

Message Format

Figure 5:
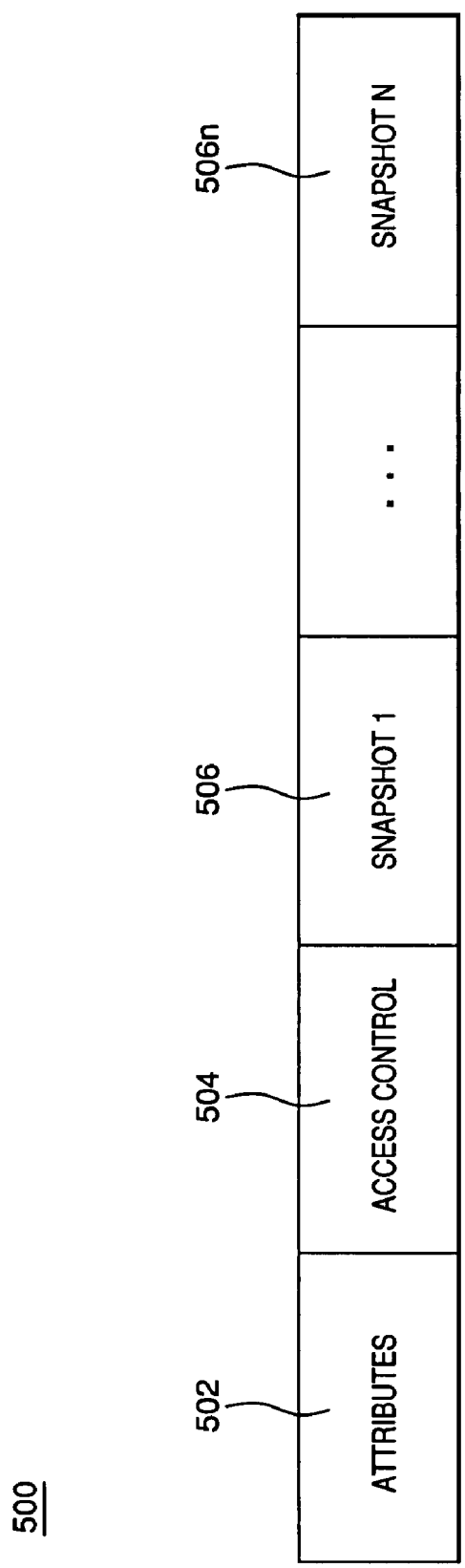
FIG. 5 is a diagram of a message.

FIG. 5 is a diagram of a message 500 that can be used to provide granular access control and management of snapshots. The message 500 includes attributes 502, access control information 504, and one or more snapshots 506-506n.

The message 500 may contain multiple snapshots 506-506n. For example, the message 500 may contain multiple snapshots 506-506n if the snapshots are taken of related file systems (e.g., log and data) or if the snapshots are taken of the same file system as it existed at different points in time. Further, the message 500 may contain multiple snapshots 506-506n if the snapshots are similar from a user perspective in a manner defined by a file server. If the message 500 contains multiple snapshots 506-506n, the snapshots are considered to be related.

To identify the snapshots 506-506n within the message 500, the snapshots 506-506n are identified by a pointer to each snapshot and/or a snapshot name. Due to the size of a snapshot, the snapshots themselves are not included in the message 500. The pointer identifies the location of metadata information for each snapshot 506-506n contained within the message 500.

To provide event-based management of the snapshots 506-506n, the message 500 includes attributes 502. The attributes 502 define an event-based trigger for managing the snapshots 506-506n contained within the message 500. Defining attributes 502 for the message 500 automatically defines the attributes 502 for all the snapshots 506-506n within the message 500. Each message 500 can have multiple attributes 502. Each attribute 502 defines an operation and argument set; the attributes 502 are not fixed and vary depending on the operation and argument.

The attributes 502 may be in any form, but by way of example may be of the form "operation-N-argument." As an illustrative example, the attribute "delete-N-access" performs the operation of deleting a message after its $N^{th}$ access after the message is restored. As an additional illustrative example, the attribute "delete-N-restore" performs the operation of deleting a message after its $N^{th}$ access after the first successful restore operation is performed on the message. After the $N^{th}$ number of operations defined in an attribute 502, each operation performs a corresponding "no op" operation that stops the usage of the particular operation. If N is zero, the operation is effective immediately after setting the attribute. Further, the attributes 502 can be defined so that an operation is performed after a set interval of time. This feature permits automatic event-based management of the one or more snapshots 506-506n included in the message without any manual intervention by a file server using the attributes 502.

To restrict access to the snapshots 506-506n, the message 500 includes access control information 504. The access control information 504 enables a user of a file server creating snapshots 506-506n to define policies that control access to the snapshots 506-506n contained within the message 500. The access control information 504 is defined for the message 500 and is applicable to all snapshots 506-506n contained within the message 500. The access control information 504 includes an access control set containing pairs of roles and groups.

The access control set may be of the form $\{(r_1, g_1), (r_2, g_2), \ldots, (r_n, g_n)\}$. The access control pair $(r_1, g_1)$ specifies that all users in group $g_1$ have access over all snapshots in the message 500 as defined by the role $r_1$. As described earlier, a role is a combination of capabilities and a group contains a set of users. Preliminary capabilities such as read, write, and login are predefined. Users within the group of users may pre-exist or may be added by a storage administrator.

An illustrative example of an access control is "(read-write, finance-manager)." This access control specifies that all managers in the finance department have access to read and write all snapshots 506-506n in the message 500. The names used in the access control pair are only illustrative of access control operation. For example, a user defining the access control pair "(read-write, finance-manager)" in the message 500 must define a "read-write" role and optionally defines a "finance-manger" group if the group does not yet exist.

In an embodiment of the present invention, the access control information 504 includes UNIX file semantics for individual snapshots. For example, a message 500 may be created to be accessible only to the file server creating the message, to a set of users in a group, or to all users accessing a storage device. Therefore, the use of access control information 504 within the message 500 provides granular control over the snapshots 506-506n because the access control information 504 is defined for a specific group of users by the user that created the message 500 and not all other users.

Existing Method for Access Control Over Snapshots

Figure 6:
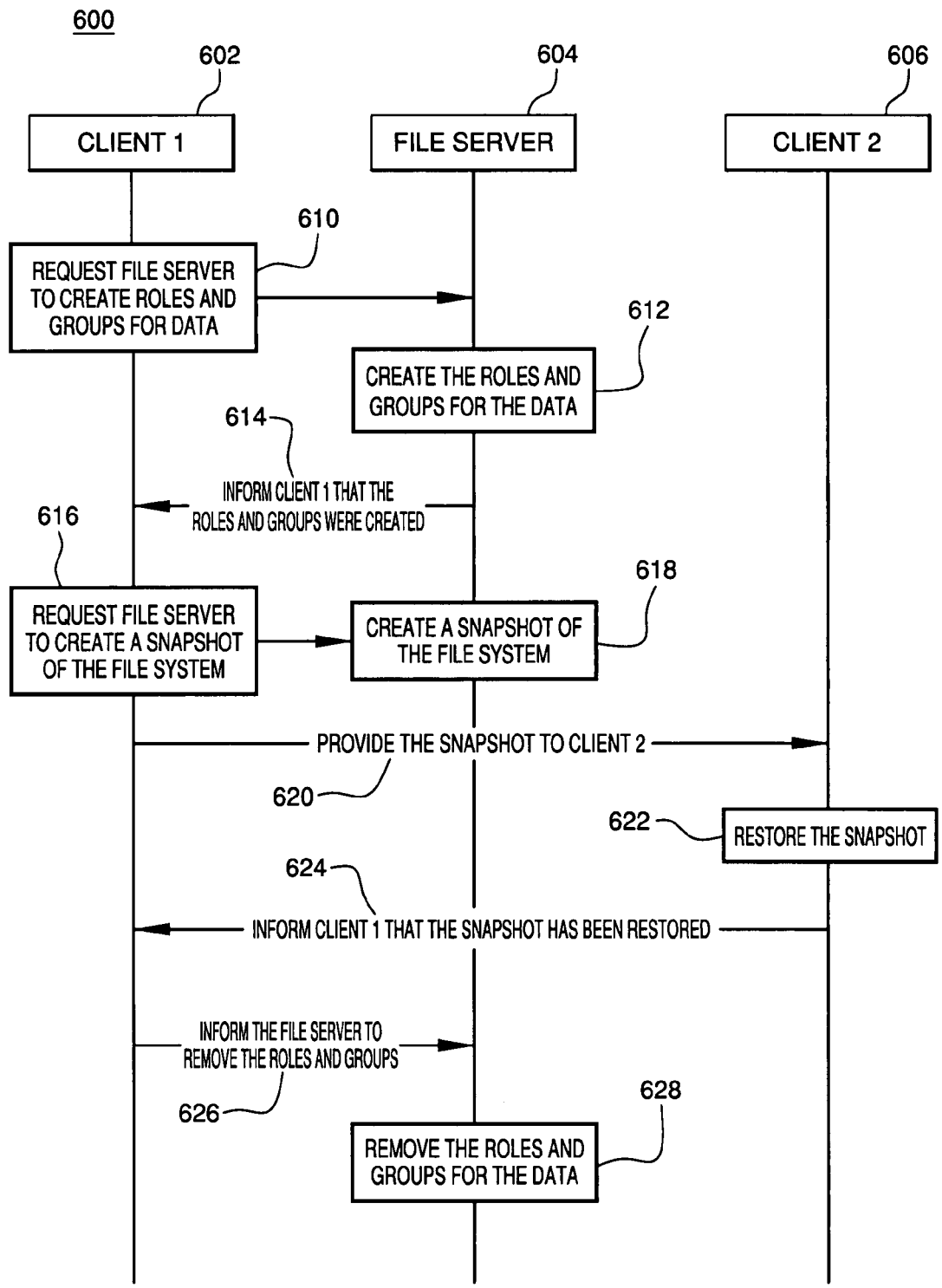
FIG. 6 is a flow diagram of an existing method for performing access control over a snapshot.

FIG. 6 is a flow diagram of an existing method 600 for performing access control over snapshots. The method 600 operates between a first client (client 1) 602, a file server 604, and a second client (client 2) 606. The first client 602, the file server 604, and the second client 606 communicate over a network connection (not shown).

The first client 602 requests that the file server 604 create roles and groups for data maintained at the file server 604 (step 610). Typically, the clients 602, 606 do not have access to the file server 604 for creating roles and groups. Therefore, a user of first client 602 must manually request that an administrator create roles and groups for data maintained at the file server 604 via telephone, e-mail, or in-person.

The administrator of the file server 604 creates the roles and groups for the data (step 612). The roles and groups are created on the file server 604 using a command line interface or a graphical user interface (GUI). Further, any application implementing the appropriate application programming interface (API) can communicate with the file server 604 to create roles and groups. After creating the roles and groups, the administrator manually informs the user of the first client 602 that the roles and groups have been created via telephone, e-mail, or in-person (step 614). The manual communication required between the user of the first client 602 and the administrator of the file server 604 is tedious and may require a considerable amount of time.

The first client 602 requests the file server 604 to create a snapshot of the file system of the file server 604 (step 616). The file server 604 creates a snapshot of the file system (step 618). The user of the first client 602 manually provides the snapshot to the second client 606 via telephone, e-mail, or in-person (step 620). The snapshot provided to the second client 606 contains a file path of the snapshot. A file path contains a filer name, complete filer volume, and a snapshot name. An example file path of a snapshot is "myfiler:/vol/myvol:mysnap". The roles and groups created by the administrator allow the first client 602 to permit a user of the second client 606 to perform operations on the snapshot. However, in contrast to the present invention, there is currently no way to restrict operations to certain users when more than one user has the same role and group.

The second client 606 restores the snapshot (step 622) by using a command line interface or a GUI. Further, any application implementing the appropriate API can communicate with the second client 606 to restore the snapshot. The user of the second client 606 then manually informs the user of the first client 602 that the snapshot has been restored via telephone, e-mail, or in-person (step 624).

The user of the first client 602 manually requests that the storage administrator delete the roles and groups via telephone, e-mail, or in-person (step 626). Next, the administrator removes the roles and groups in the file server 604 (step 628). The roles and groups are deleted from the file server 604 by using a command line interface or a GUI. Further, any application implementing the appropriate API can communicate with the file server 604 to delete the roles and groups.

As can be seen from FIG. 6, the method 600 requires multiple communications between the user of the first client 602 and the administrator of the file server 604. The file server 604 need not be located within nor have constant communication with the first client 602, but the administrator of the file server 604 needs to have manual communications with the user of the first client 602. Thus, it is difficult to optimize the various communications between the user of first client 602 and the administrator of the file server 604. However, as described below, it is possible to optimize the communication between the user of first client 602 and the user of the second client 606 using messages.

Using Messages to Provide Access Control to Snapshots

Figure 7:
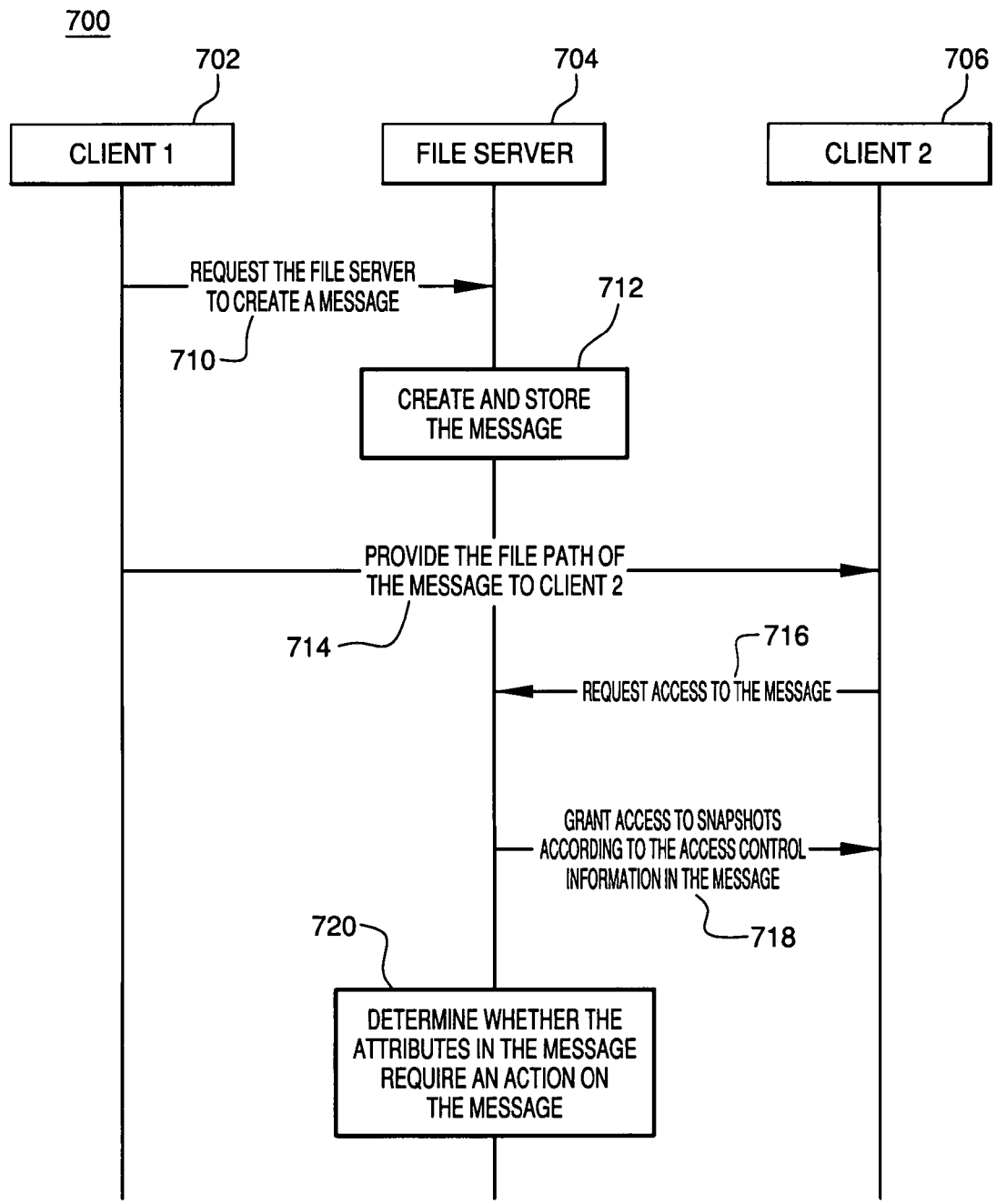
FIG. 7 is a flow diagram showing an exemplary implementation of the method shown in FIG. 4 for performing access control over a snapshot using messages.

FIG. 7 is a flow diagram of an exemplary implementation of a method 700 utilizing a message to provide granular access control over one or more snapshots contained in the message and enabling users to perform automatic event-based management of the snapshots contained in the message. The method 700 operates between a first client 702, a file server 704, and a second client 706. The first client 702, the file server 704, and the second client 706 communicate over a network connection (not shown).

A user of the first client 702 executes an application (using a command line interface or a GUI) on the operating system of the first client to request the file server 704 to create a message to be stored on the file server 704 (step 710). An example of the executed application is SnapDrive® for UNIX from NetApp®. This application runs at the application layer and communicates with a file system of the first client 702, the file system of the file server 704, and peer applications on other clients. Any application implementing the appropriate API can communicate with the application to create the requested message from the first client 702. The message creation request includes one or more snapshot names, attributes for the message, and access control information, including roles and groups, for the message.

The file server 704 creates and stores the message according to the request received from the first client 702 on the file server 704 (step 712). The file server 704 stores the message, including the one or more snapshot names, attributes for the message, and access control information for the message. As stated above with respect to FIG. 5, the access control information for the message is an access control set and contains pairs of roles and groups. In contrast to the method 600 described above, the administrator of the file server 704 need not be involved in controlling access to the snapshots contained in the message.

To send the message from the first client 702 to the second client 706, the user of the first client 702 manually provides the file path of the message to the user of the second client 706 via telephone, e-mail, or in-person (step 714). Similar to method 600, described above, this step also requires manual communication between the user of the first client 702 and the user of the second client 706. However, in contrast to method 600, this is the only manual communication needed between the users of the clients 702, 706 and does not involve the administrator of the file server 704.

The second client 706 executes an application on the operating system of the second client 706 and requests access to the message stored at the file server 704 using a command line interface or a GUI (step 716). An example application is SnapDrive® for UNIX from NetApp®. The application runs at the application layer and communicates with a file system of the second client 706, the file system of the file server 704, and peer applications on other clients. Any application implementing the appropriate API can communicate with the application on the second client 706 to request access to the message.

When the file server 704 is not accessible to both the first client 702 and the second client 706, the message may be replicated, for example using SnapRestore® technology from NetApp®, from the file server 704 to a second file server that is accessible to the second client 706.

Access to the snapshots in the message is granted to the application on the second client 706 according to the access control information in the message (step 718). The application on the second client 706 specifies the role and group of the application user when requesting access to the snapshots. The role and group of the application user is compared against the pairs of roles and groups specified in the access control information in the message. If the role and group of the application user matches the access control information in the message, the user is granted access to the snapshots and may perform operations on the snapshots as permitted by the access control information.

In an alternative embodiment, if the role and group of the application user on the second client 706 do not match any of the access control information in the message, an access violation event is generated by the application on the second client 706. The access violation event informs the user that the access request has been denied. In an illustrative embodiment, as a result of the access violation event, the application on the second client 706 may change its role and group and/or log the event.

After the message has been accessed, the attributes in the message determine whether an action is required on the message by the file server 704 after the application on the second client 706 requests access to the message (step 720). As stated above with respect to FIG. 5, the attributes define an event-based trigger for managing the one or more snapshots contained within the message.

In contrast to the method 600 described above in FIG. 6, the method 700 provides the advantage of optimizing communication between the first client 702, the file server 704, and the second client 706 by minimizing the number of communications between these entities.

System to Manage Snapshots Using Messages

Figure 8:
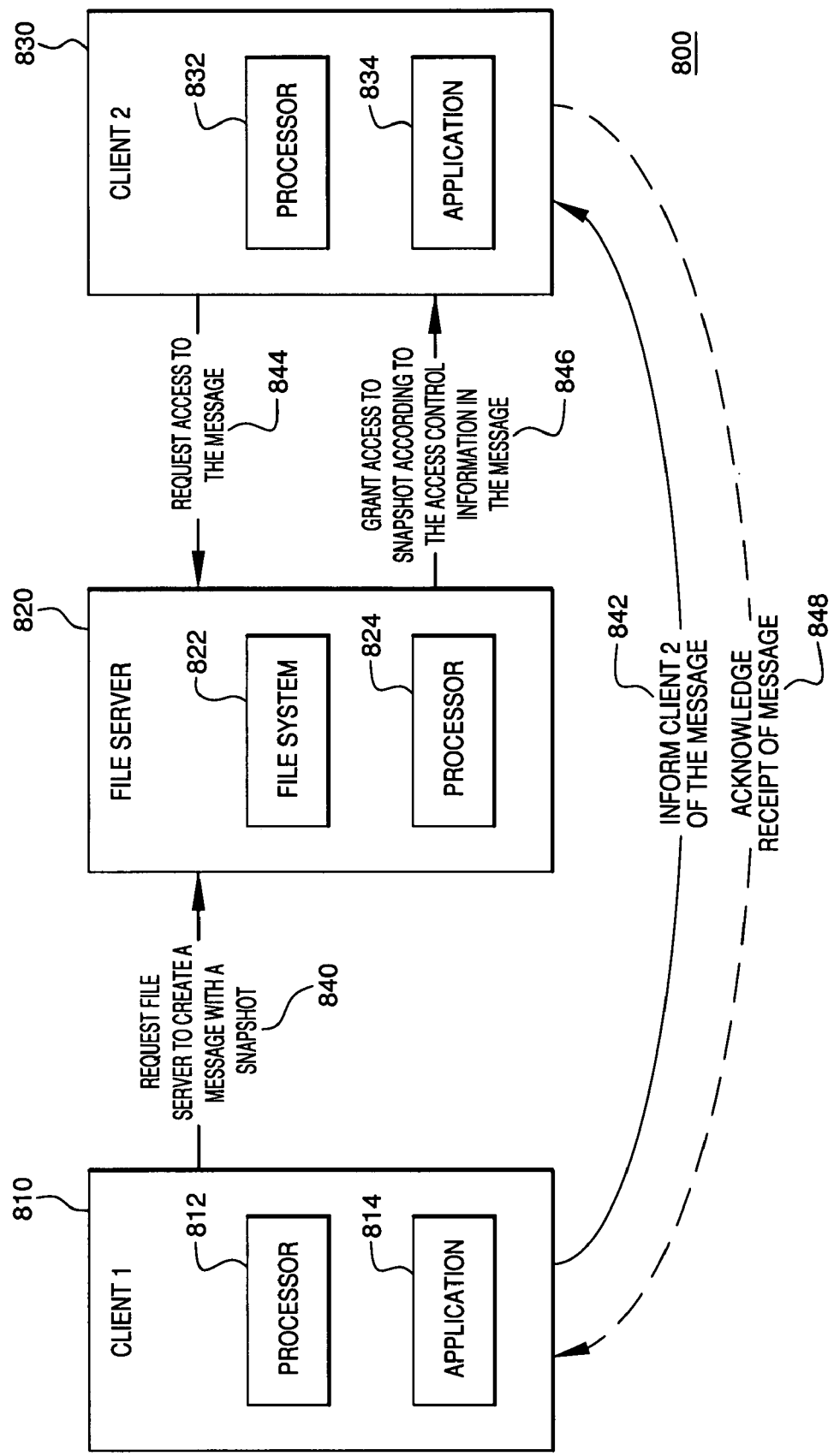
FIG. 8 is a diagram of a system configured to manage snapshots of a file system using messages.

FIG. 8 is a diagram of a system 800 configured to manage snapshots of a file system using messages. The system includes a first client (client 1) 810, a file server 820, and a second client (client 2) 830. The first client 810 includes a processor 812 and an application 814. The file server 820 includes a file system 822 and a processor 824. The second client 830 includes a processor 832 and an application 834. The first client 810, the file server 820, and the second client 830 communicate over a network connection (not shown).

In operation, a user executes the application 814 on the processor 812 in the first client 810 to request the file server 820 to create a message with a snapshot (step 840). An example application is SnapDrive® for UNIX from NetApp®. The application runs at the application layer and communicates with the file system 822 of the file server 820 and peer applications on other clients. As an illustrative embodiment, the message includes one or more snapshots of the file system 822, attributes for the message, and/or access control information according to the request received from the first client 810. As stated above with respect to FIG. 5, the access control information for the message is an access control set and contains pairs of roles and groups. The processor 824 in the file server 820 controls creation and storage of the message.

The user of the first client 810 informs a user of the second client 830 that a message has been created (step 842) and provides the location of the message on the file server 820. Then, the user of the second client 830 executes the application 834 on the processor 832 of the second client 830 and requests access to the message stored on the file server 820 (step 844). An example application is SnapDrive® for UNIX from NetApp®. The application runs at the application layer and communicates with the file system 822 of the file server 820 and peer applications on other clients. The application 834 specifies the role and group of the user of the second client 830 when requesting access to the message.

Access to the message is granted to the application 834 according to the access control information in the message. The role and group of the application user of the second client 830 is compared against the pairs of roles and groups specified in the access control information in the message. If the role and group of the application user matches the access control information in the message, the user is granted access to the snapshots and may perform operations on the snapshots as permitted by the access control information (step 846). Optionally, the user of the second client 830 sends an acknowledgement of receipt of the message to the first client 810 (step 848).

In an alternative embodiment, if the role and group of the application user on the second client 830 do not match the access control information in the message, an access violation event is generated by the application 834. The access violation event informs the user of the second client 830 that the access request has been denied. In an illustrative embodiment, as a result of the access violation event, the application 834 may change its role and group and/or log the event.

After the message has been accessed, the attributes in the message determine whether an action is required on the message by the file server 820 after the application 834 requests access to the message. As stated above with respect to FIG. 5, the attributes define an event-based trigger for managing the one or more snapshots contained within the message.

The present invention can be implemented in a computer program tangibly embodied in a computer-readable storage medium containing a set of instructions for execution by a processor or a general purpose computer; and method steps of the invention can be performed by a processor executing a program of instructions to perform functions of the invention by operating on input data and generating output data. Suitable processors include, by way of example, both general and special purpose processors. Typically, a processor will receive instructions and data from a read only memory (ROM), a random access memory (RAM), and/or a storage device. Storage devices suitable for embodying computer program instructions and data include all forms of non-volatile memory, including by way of example semiconductor memory devices, magnetic media such as internal hard disks and removable disks, magneto-optical media, and optical media such as CD-ROM disks and digital versatile disks (DVDs). In addition, while the illustrative embodiments may be implemented in computer software, the functions within the illustrative embodiments may alternatively be embodied in part or in whole using hardware components such as Application Specific Integrated Circuits (ASICs), Field Programmable Gate Arrays (FPGAs), or other hardware, or in some combination of hardware components and software components.

While specific embodiments of the present invention have been shown and described, many modifications and variations could be made by one skilled in the art without departing from the scope of the invention. The above description serves to illustrate and not limit the particular invention in any way.

What is claimed is:

1. A method for managing at least one point in time image (PITI) of a file system, comprising the steps of:
   creating one or more PITIs of a file system, wherein each PITI is an image of the file system created at a predetermined point in time;
   generating a message containing the one or more PITIs;
   setting attributes for the message, wherein the attributes define an event-based trigger for managing the one or more PITIs in the message; and
   setting access control information for the message, wherein the access control information controls access to the one or more PITIs included in the message to one or more selected users.

2. The method according to claim 1, wherein an attribute includes an operation to be performed on the message, a number of times the operation is to be performed, and an argument that indicates when the operation is first performed.

3. The method according to claim 1, wherein each message has at least one attribute.

4. The method according to claim 3, wherein each attribute defines an operation and argument set by a user.

5. The method according to claim 1, wherein the attributes permit automatic operations on the snapshots in the message without manual intervention.

6. The method according to claim 1, wherein the access control information is used to reduce a security threat to the one or more PITIs included in the message by restricting access to the one or more PITIs to the one or more selected users.

7. A method for providing access to a snapshot of a file system, comprising the steps of:
   requesting a file server to create a message, the message including the snapshot;
   creating the message at the file server;
   storing the message at the file server; and
   accessing the message by a client, whereby the client can access the snapshot in the message.

8. The method according to claim 7, wherein the message includes access control information to control access to the snapshot, whereby only authorized clients can access the snapshot.

9. The method according to claim 8, wherein the message includes more than one snapshot and the access control information is applicable to all snapshots in the message.

10. The method according to claim 7, wherein the message includes attributes applicable to the message, the attributes defining operations that can be performed on the message.

11. The method according to claim 10, wherein the attributes permit event-based management of the snapshot in the message.

12. The method according to claim 10, wherein an attribute includes an operation to be performed on the message, a number of times the operation is to be performed, and an argument that indicates when the operation is first performed.

13. The method according to claim 10, wherein the operations are performed on the message by the file server.

14. The method according to claim 7, wherein the message includes more than one snapshot and the client can access all of the snapshots in the message.

15. The method according to claim 7, wherein the requesting step is performed by a first client and the accessing step is performed by a second client, the first client being different from the second client.

16. The method according to claim 15, further comprising the step of:
   informing the second client by the first client that the message is stored on the file server, including providing a location of the message on the file server such that the second client can access the message.

17. The method according to claim 15, further comprising the step of:
   sending an acknowledgement from the second client to the first client that the second client has accessed the message.

18. A computer-readable storage medium storing a set of instructions for execution by a general purpose computer to provide access to a snapshot of a file system, the set of instructions comprising:
   a requesting code segment for requesting a file server to create a message, the message including the snapshot;
   a creating code segment for creating the message at the file server;
   a storing code segment for storing the message at the file server; and
   an accessing code segment for accessing the message by a client, whereby the client can access the snapshot in the message.

19. A system for providing access to a snapshot of a file system, comprising:
   a first client;
   a file server including the file system, said file server in communication with said first client;
   a second client in communication with said first client and said file server;
   wherein:
      said first client is configured to request said file server to create a message containing the snapshot;
      said file server is configured to create the message and store the message;
      said first client is further configured to inform said second client that the message is stored on said file server, including providing a location of the message on said file server such that said second client can access the message; and
      said second client is configured to access the message, whereby said second client can access the snapshot in the message.

20. The system according to claim 19, wherein the message includes access control information to control access to the snapshot, whereby said second client can access the snapshot only if permitted by the access control information.

21. A method for controlling access to a snapshot of a file system associated with a first client and restored by a second client, the method comprising:
- requesting a file server to create a message by the first client;
- creating the message by the file server, wherein the message includes at least one snapshot of the file system, attributes that define an event-based trigger for managing the message, and access control information for defining policies that control access to the message;
- providing a file path of the message to the second client;
- granting the second client access to the message according to the access control information in the message; and
- determining whether the attributes in the message require an action on the message by the file server.

22. The method according to claim 21, wherein the creating step includes determining whether additional snapshots need to be added to the message, the determining being made by a user creating the message.

23. The method according to claim 22, wherein all snapshots contained within the message are related.

24. The method according to claim 21, wherein the attributes and access control information for the message are applicable to all snapshots contained within the message.

25. The method according to claim 21, wherein each message has at least one attribute.

26. The method according to claim 25, wherein each attribute defines an operation and argument set by a user.

27. The method according to claim 21, wherein the attributes permit automatic operations on the snapshots in the message without manual intervention.

28. The method according to claim 21, wherein the access control information enables a user to define access control for a specific group of users.

29. The method according to claim 21, wherein the file path of the message is manually provided to a user of the second client.

30. The method according to claim 21, wherein the file server grants access to the message according to the credentials of the second client.

31. A file server configured to control access to a snapshot of a file system, comprising:
- the file system; and
- a processor configured to:
  - create a snapshot of the file system, wherein the snapshot is a restorable version of the file system created at a predetermined point in time;
  - generate a message containing the snapshot; and
  - set attributes and access control information for the message, wherein the attributes define an event-based trigger for managing the snapshots in the message and the access control information defines policies that control access to the snapshot in the message.

32. The file server according to claim 31, wherein a user issues a command to the file server to create the snapshot.

33. The file server according to claim 31, wherein the processor is further configured to determine whether additional snapshots need to be added to the message, the determination being made by a user creating the message.

34. The file server according to claim 33, wherein all snapshots contained within the message are related.

35. The file server according to claim 33, wherein the attributes and access control information for the message are applicable to all snapshots contained within the message.

36. The file server according to claim 31, wherein the message has at least one attribute.

37. The file server according to claim 36, wherein each attribute defines an operation and argument set by a user.

38. The file server according to claim 31, wherein the attributes permit automatic operations on the snapshot in the message without manual intervention.

39. The file server according to claim 31, wherein the access control information enables a user to define access control for a specific group of users.

* * * * *